United States Patent
Lou et al.

(10) Patent No.: US 10,880,554 B2
(45) Date of Patent: Dec. 29, 2020

(54) BIT STREAM MANAGEMENT IN VIDEO COMMUNICATION

(71) Applicant: Alibaba Group Holding Limited, Grand Cayman (KY)

(72) Inventors: Jian Lou, Bellevue, WA (US); Yu-Chen Sun, Bellevue, WA (US)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 16/001,568

(22) Filed: Jun. 6, 2018

(65) Prior Publication Data
US 2019/0379892 A1 Dec. 12, 2019

(51) Int. Cl.
| *H04N 19/166* | (2014.01) |
| *H04N 19/105* | (2014.01) |
| *H04N 19/88* | (2014.01) |
| *H04N 19/184* | (2014.01) |

(52) U.S. Cl.
CPC ......... *H04N 19/166* (2014.11); *H04N 19/105* (2014.11); *H04N 19/184* (2014.11); *H04N 19/88* (2014.11)

(58) Field of Classification Search
CPC .... H04N 19/14; H04N 19/115; H04N 19/184; H04N 19/177; H04N 19/152; H04N 19/43; H04N 19/166; H04N 19/105; H04N 19/88; H04N 7/32; H04N 7/26; H04N 7/18; H04N 7/16; H04N 9/44; H04N 5/04
See application file for complete search history.

(56) References Cited

U.S. PATENT DOCUMENTS

| 6,990,120 | B1* | 1/2006 | Lindgren | H04Q 11/04 370/468 |
| 9,369,507 | B2* | 6/2016 | Friend | H04L 29/08 |
| 2003/0007515 | A1* | 1/2003 | Apostolopoulos | H04N 21/4622 370/503 |
| 2004/0218673 | A1* | 11/2004 | Wang | H04N 21/23424 375/240.12 |
| 2006/0095942 | A1* | 5/2006 | van Beek | H04N 21/2343 725/81 |
| 2006/0095943 | A1* | 5/2006 | Demircin | H04N 19/166 725/81 |
| 2006/0095944 | A1* | 5/2006 | Demircin | H04N 19/172 725/81 |
| 2007/0153916 | A1* | 7/2007 | Demircin | H04N 21/2365 375/240.26 |
| 2013/0166391 | A1* | 6/2013 | Blow | H04L 67/06 705/14.66 |

(Continued)

*Primary Examiner* — Dramos Kalapodas
(74) *Attorney, Agent, or Firm* — Lee & Hayes, P.C.

(57) ABSTRACT

A device is disclosed. The device includes: an encoder configured to encode a first bit stream and a second bit stream, the first bit stream comprising a first plurality of frames, the second bit stream comprising a second plurality of frames; a processor configured to determine a first encoding parameter of the first bit stream and a second encoding parameter of the second bit stream, the first encoding parameter different from the second encoding parameter; and a communication module configured to transmit the first bit stream and the second bit stream over a network. The first plurality of frames and the second plurality of frames are transmitted in an interleaving fashion.

18 Claims, 5 Drawing Sheets

(56) References Cited

U.S. PATENT DOCUMENTS

| | | | |
|---|---|---|---|
| 2013/0322516 A1* | 12/2013 | Zhang | H04N 19/61 375/240.02 |
| 2014/0328414 A1* | 11/2014 | Puri | H04N 19/176 375/240.29 |
| 2015/0312601 A1* | 10/2015 | Novotny | H04N 21/23655 725/117 |
| 2016/0277756 A1* | 9/2016 | Shen | H04N 19/146 |
| 2017/0078671 A1* | 3/2017 | Coward | H04N 19/14 |
| 2018/0027039 A1* | 1/2018 | Moorthy | H04L 65/4084 709/219 |
| 2019/0166576 A1* | 5/2019 | Kim | H04W 36/08 |

* cited by examiner

BIT STREAM MANAGEMENT IN VIDEO COMMUNICATION

BACKGROUND

With advances in and proliferation of communication technologies, video communication has experienced increasing demand and seen tremendous growth in popularity. Video communication typically involves transmitting and/or receiving a series of images (or pictures) over a network between at least two devices. Before being transmitted over a network, a video can be coded in a sequence of bits that represents the series of images of the video. This sequence of bits can be referred to as a bit stream.

Because of the redundancy inherent in a video stream (e.g., similarities found in consecutive frames of a video), prediction can be introduced to increase the efficiency in video coding. Inter prediction is a type of prediction derived from decoded samples of reference pictures other than the current decoded picture. These decoded samples of reference pictures can be pictures decoded from one or more previous frames of the video. These decoded reference pictures can be stored in a decoded picture buffer (DPB).

When an encoder codes a new block, one or more previously-reconstructed frames from the DPB can construct one or two reference frame lists for the current frame to find its most similar frame from the list(s). At the decoder side, based on the information in the received bit stream, the decoder can find the corresponding reconstructed frames from its DPB and locate the corresponding block location in the reference frames for reconstruction of the current frame. When all the frames in the reference list(s) for the current frame are found, the current frame may be correctly decoded. Inter prediction can reduce the time required to encode/decode a bit stream because at least some of the frames can be derived from previously-decoded reference pictures.

Due to network restrictions, packet loss is common during a transmission of video data. When packet loss occurs, one possible fix is to request the sender to resend the packet again, which may take a long time for the receiver to receive the missing packet. This time delay might not be acceptable during live or interactive video communication. Another possible solution for compensating for packet loss is the use of a forward error correction (FEC) code to introduce redundancy in the packets to allow, to some extent, the recovery of a lost packet. However, FEC may introduce congestion if the network bandwidth is already limited.

Therefore, when packet loss occurs during a live video session, the current frame can be discarded and, thus, may not be used for future reference. This can cause problems when decoding subsequent frames under the traditional reference frame management approaches (e.g., inter prediction) discussed above. This is especially the case during the connecting phase, which involves one of the devices (i.e., the sender) transmitting the Intra coded frame (I frame) to the receiver. The I frame can be very large and, thus, there is a high probability of packet loss when the I frame is transmitted over a network. As a result, it can be a challenge to establish a video connection quickly and effectively between two devices over a network with poor service quality.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

In general, embodiments of the disclosure are directed to systems and methods of adaptive bit stream management for video communication over a network, particularly one with poor quality of service (e.g., limited bandwidth, high rate of packet loss).

In some embodiments, during the connecting phase (e.g., when one device, the sender, is attempting to establish a connection over a network with another device, the receiver), the sender can encode frames with different encoding parameters (e.g., frame rate, bitrate, picture resolution) and transmit the encoded frames in multiple bit streams. Upon receiving feedback from the receiver that one of the frames has been received, the sender can adaptively select, based on feedback from the receiver, one set of encoding parameters for encoding subsequent frames. Additionally or alternatively, by encoding frames in multiple bit streams, each allocated with its own buffer, the sender can ensure that no reference frame is discarded before the sender receives feedback from the receiver, in case one of the reference frames is needed for future reference.

Figure 1:
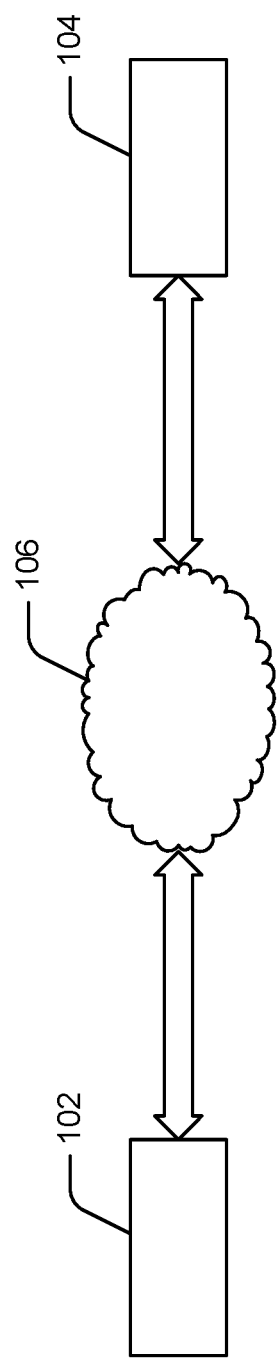
FIG. 1 is an example block diagram illustrating two devices connected to a network, according to an embodiment of the disclosure.

FIG. 1 illustrates a first device 102 and a second device 104 connected to a network 106. The terms "device," "client," and "terminal" all refer to network-enabled devices and are used interchangeably in this document. The first device 102 and the second device 104 can be any device capable of supporting video communication over the network 106. The device transmitting a video is referred to herein as "the transmitting device" or "the sender." The device receiving a video is referred to herein as "the receiving device" or "the receiver." Both devices 102 and 104 can be the sender and/or the receiver or both depending on whether it is transmitting or receiving a video. Each of the devices 102 and 104 can include one or more encoders (not shown in FIG. 1) for encoding video data in a bit stream prior to transmitting it over the network 106. Each of the devices 102 and 104 can also include one or more decoders (not shown in FIG. 1) for decoding video data received from the other device. Examples of the devices 102 and 104 can include, but are not limited to, computers, mobile devices, smart televisions, video-conferencing terminals, and the like. The network 106 can be the Internet, a local area network (LAN), a wide area network (WAN), a virtual private network (VPN), or any other network capable of supporting a two-way video connection between two devices 102 and 104.

In one embodiment, a video communication session can be initiated between the first device 102 and the second device 104. The video communication session can be a real-time video conference in which each device transmits live pictures of its surroundings captured by, for example, a camera system to the other device. The live video can be transmitted by the sender (e.g., device 102) as bit streams that are sequences of bits representing coded images. These coded images can be decoded at the receiving device (e.g., device 104) for presentation on a display. The receiving device 104 can, in turn, transmit feedback to the sender 102. The feedback can include information confirming the receipt of at least one frame from the sender, the number of packets received, the delay at the receiver end, and/or any other information that may help facilitate communication between the devices 102 and 104. The feedback can be in various format depending, for example, on the network protocol. In a live video session, both devices 102 and 104 can be transmitting videos and receiving feedback from the other device simultaneously.

As mentioned above, due to the restrictions of the network 106 (e.g., bandwidth, packet loss), the sender (e.g., device 102) may not receive any feedback from the receiver (e.g., device 104) after transmitting data over the network 106. Or there may be a time delay during the transmission that can result in the feedback not being received within a certain period of time. When either of these situations occurs, the sender may not be able to make an accurate determination of the network conditions, which may affect the quality of subsequent communication between the devices.

Typically, when establishing a video connection between two devices, the sender encodes the video data in a single bit stream with specified encoding parameters (e.g., bitrate, image resolution) based on very limited knowledge about the network such as the type of the network (e.g., Wi-Fi or 4G) it is connected to. Because the sender knows very little about the actual network conditions (e.g., available bandwidth, delay) before it receives any feedback from the receiver, the initial encoding parameters used for coding the frames may not work well for the particular network.

Figure 2:
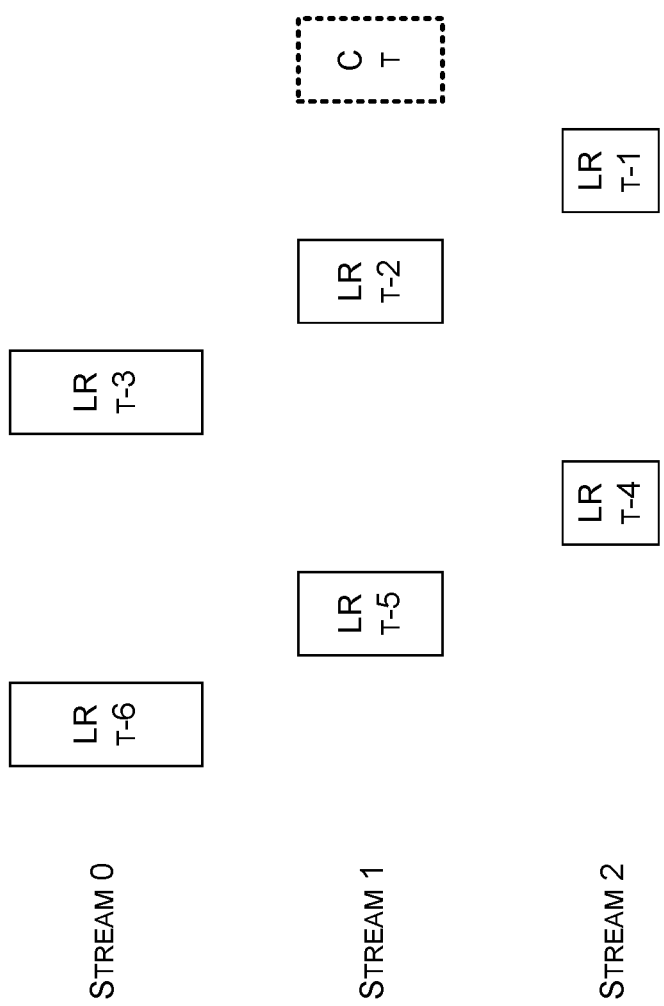
FIG. 2 illustrates an exemplary way of transmitting video frames in multiple bit streams, according to an embodiment of the disclosure.

FIG. 2 illustrates an embodiment that allows the sender, such as the first device 102, to be able to determine the encoding parameters for a video connection effectively and with minimum delay. Specifically, the sender can encode the I frames in multiple bit streams in an interleaving fashion. More specifically, the encoders of the sender could encode the I frames into several bit streams with different sequence parameter sets identified with different "seq_parameter_set_id." In this example, parameters such as the resolution of the video and the bitrate are set differently for each of the bit streams.

As illustrated in FIG. 2, Stream 0 may be encoded with a resolution of 640×360 pixels and a bitrate of 500 kbps. Stream 1 may be encoded with a resolution of 320×180 pixels and a bitrate of 250 kbps. Stream 2 may be encoded with a resolution of 160×90 pixels and a bitrate of 100 kbps. The different sizes of the frames in the three bit streams (i.e., Streams 0, 1, and 2) correspond to the different resolutions of these frames. Each frame in this embodiment can be a long-term reference (LR) frame with a time stamp (e.g., t−6, t−5, . . . t−1, t) indicating the time interval at which the frame is transmitted over the network.

When attempting to establish a connection, the sender encodes a first of the I frames with the encoding parameters of Stream 0 (i.e., 640×360 resolution, 500 kbps bitrate) and transmits it over a network, such as the network 106, at time t−6. The next frame can be encoded with the encoding parameters of Stream 1 (i.e., 320×180 resolution, 250 kbps bitrate) and transmitted at the next time interval t−5. A third frame can be encoded with the encoding parameters of Stream 2 (i.e., 160×90 resolution, 100 kbps) and transmitted to the receiver at time t−4. The process can then be repeated from t−3 to t−1 during which the next three frames are encoded with the respective encoding parameters of Streams 0, 1, 2 before being transmitted over the network 106.

These encoded frames may arrive at the receiver, such as the second device 104, out of order. For example, frame t−5 may be the first frame to be received and decoded by a decoder of the receiver although it was not the first frame transmitted by the sender. This may be due to the earlier frame, the t−6 frame, having too many packets to get through the congestion of the network. Once the sender receives feedback from the receiver acknowledging that frame t−5 is the first frame to be successfully decoded at the receiver, the sender can encode the next frame, e.g., frame C, and all subsequent frames with the encoding parameters of Stream 1 (i.e., 320×180 resolution and 500 kbps bitrate). The sender can cease encoding the other two bit streams, Streams 0 and 2. Essentially, by encoding frames in three different bit streams with different encoding parameters and transmitting them in an interleaving fashion, the sender can determine, within a short amount of time, the best encoding parameters for the video connection based on which frame arrives at the receiver first.

Although three bit streams are used in the embodiment of FIG. 2, it should be understood that the number of bit streams can vary. In some embodiments, the sender could encode frames in only two bit streams. In others, there may be more than three bit streams. It should also be understood that the encoding parameters of each bit stream are not limited to the bitrate and resolution of the frames.

Alternatively or additionally, multiple bit streams can be used to ensure that a reference frame, whether a LR frame or a short-term reference (SR) frame, is not discarded from a buffer before it can be determined that the frame is not going to be used as a reference when decoding a subsequent frame. While the sender is waiting for the receiver to acknowledge the successful decoding of a frame sent by the sender during the connecting phase, the sender needs to buffer the frames that have been sent in case it needs to use these frames as reference frames later. When a frame is discarded from the buffer, it can no longer be used as a reference frame. However, current video encoding standards typically specify a maximum number of frames that can be buffered. For example, the H.264 standard specifies the maximum number of long term reference frames to be eight. This may cause a problem when the buffer needs to be reused after the maximum number of frames is reached and the sender has yet received any feedback from the receiver.

Currently, the sender can set the number of long term (LR) reference frames to the maximum number of frames allowed by the network standard (e.g., eight in H.264 standard) so that the sender could wait for a maximum duration for an acknowledgement (or feedback) acknowledging the successfully decoding of a frame from the receiver. However, even having the maximum number of LR reference frames might not be enough for large round trip time (RTT) data transfers in a high frame per second (FPS) scenario, which may require more than the maximum duration. Moreover, the current method is also not ideal for dealing with network with a varying bandwidth.

Figure 3:
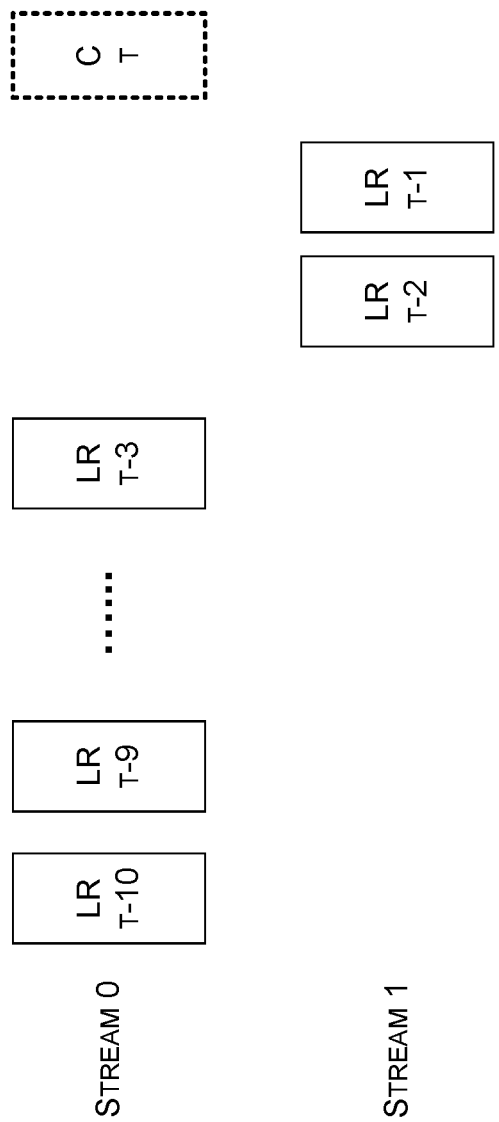
FIG. 3 illustrates another exemplary way of transmitting video frames in multiple bit streams, according to an embodiment of the disclosure.

In the embodiment illustrated in FIG. 3, multiple bit streams are used to encode the frames to ensure that frames are not deleted from the buffers until the sender receives feedback from the receiver. In the illustrated example, a first bit stream, Stream 0, can encode the first eight frames from time t−10 to t−3 and save them in a buffer reserved for Stream 0 as LR frames. At time t−3, if there is still no feedback from the receiver indicating that at least one of these frames has been successfully received and decoded by the receiver, an encoder on the sender can start a second bit stream, Stream 1, to encode additional frames and set them to be LR frames (e.g., LR t−2, LR t−1). Stream 1 can be assigned with a different buffer, which allows the frames in Stream 0 to be preserved in the buffer allocated to Stream 0 and not overwritten by the frames of Stream 1. That is, instead of reusing the buffers assigned to Stream 0 for storing subsequent frames, the sender can store the next two frames (LR t−2 and LR t−1) in a different buffer allocated for Stream 1.

When the sender finally receives feedback from the receiver indicating that frame t−10 has been successfully received and decoded by the receiver, the encoder on the sender can encode the current frame C and all subsequent frames with the encoding parameters of Stream 0. Again, by using multiple bit streams, each having its own buffer, the sender is able to prevent frame t−10 from being deleted from the buffer even though the number of frames transmitted before the feedback is received exceeded the maximum number of frames (e.g., eight LR frames) defined by the network standard. If the buffers assigned to both Streams 0 and 1 are full and yet there is still no feedback from the receiver, a third bit stream (not shown in FIG. 3) can be used for encoding additional frames. A separate buffer can be assigned to the third bit stream. This allows the frames from both Stream 0 and Stream 1 to remain in their respective buffer. It should be understood that additional bit streams/buffers can be allocated depending on the number of frames required to be saved as reference frames. The buffers can be reserved before the frames are encoded for transmission over the network.

Note that, in the embodiments disclosed with respect to FIGS. 2 and 3, the frames marked as "C" represent the current frames, the frames marked as "LR" represent the long-term reference frames. Multiple streams can be encoded by different encoders at the sender and decoded by different decoders at the receiver.

As discussed above, the traditional method, which sets the number of long term reference frames to the maximum allowed by a network standard (e.g., eight frames in the H.264 standard), does not work for large RTT data transfers. The methods disclosed herein can hold substantially more long term reference frames as long as the number of bit streams meets the standard requirement (e.g., 32 in H.264 standard). The disclosed methods can also deal with varying bandwidth in a network, because the different bit streams could be encoded with different parameters (e.g., video resolution and bitrate).

Indeed, the different ways of using multiple bit streams disclosed in the embodiments illustrated in FIGS. 2 and 3 can be combined. Instead of encoding and transmitting the first eight frames in Stream 0 and the next two in Stream 1, as illustrated in FIG. 3, the frames can be encoded and transmitted in an interleaving fashion similar to the sequence illustrated in FIG. 2. For example, frame t−10 can be encoded with Stream 0. Frame t−9 can be encoded with Stream 1. Frame t−8 can switch back to Stream 0 and so forth. Each bit stream can be encoded by a separate encoder having its own encoding parameters. As such, the advantages of both embodiments illustrated in FIGS. 2 and 3 can be realized in a single embodiment.

Figure 4:
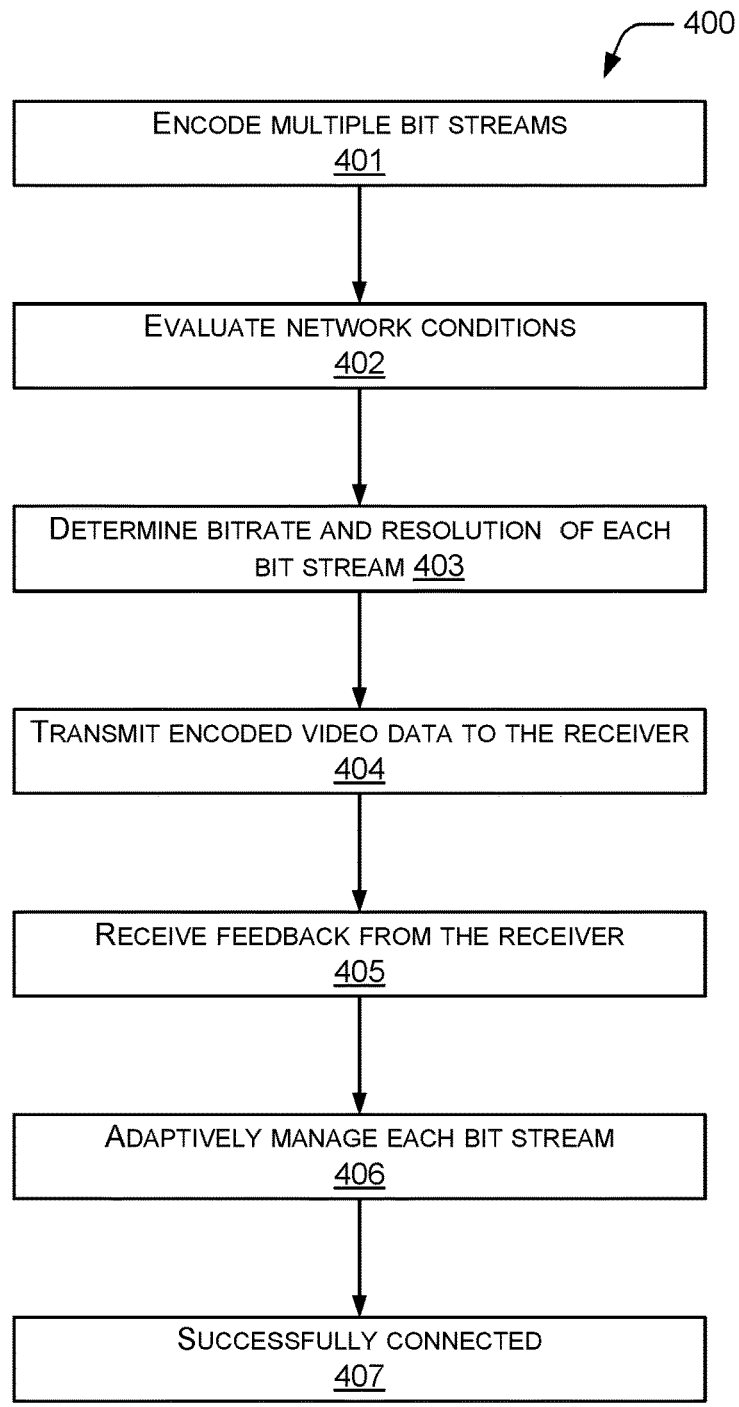
FIG. 4 is a flow chart illustrating the exemplary steps in establishing a video connection between two devices, according to an embodiment of the disclosure.

FIG. 4 is a flowchart 400 illustrating the exemplary steps in facilitating a video connection between two devices, according to an embodiment of the disclosure. At the beginning of the connecting process, to establish a stable connection quickly, the sender (e.g., the first device 102 in FIG. 1) can encode multiple bit streams for transmitting video data (Step 401). Next, the sender can evaluate the network conditions based on, but not limited to, the local network type (e.g., Wi-Fi or 4G), local network conditions, network types of other clients, network conditions of other clients, and other network information such as network bandwidth, network delay and network congestions (Step 402). At least some of this information may be ascertained from knowledge gained from a previous network session.

Once a preliminary assessment of the network conditions is completed, the sender may determine the encoding parameters such as the bitrate and video resolution of each bit stream (Step 403). It should be understood that other similar steps can be added for other encoding parameters that need to be determined. Video data can then be encoded in the multiple bit streams and transmitted to the receiver, in accordance with the processes disclosed above with reference to FIGS. 2 and/or 3 (Step 404).

At some point during the connecting process, the sender can receive feedback from the receiver (Step 405). The sender can adaptively manage the bit streams (e.g., selecting one set of parameters as the encoding parameters for the connection) based on the feedback (Step 406). Network conditions may likewise be factored into the process for adaptively altering the parameters. Finally, the sender receives feedback from the receiver indicating that the receiver has successfully received and decoded all the I frames, which signifies that the connection is successfully established (Step 407).

Embodiments of the disclosed methods can fully utilize the H.264/H.265 or any other existing video coding standard syntax to generate standard conforming video bit streams for video communication under imperfect network condition. By generating multiple video bit streams with different video sequence parameter sets, the sender can adaptively switch the encoded bit streams while achieving the shortest connection time between two devices.

Figure 5:
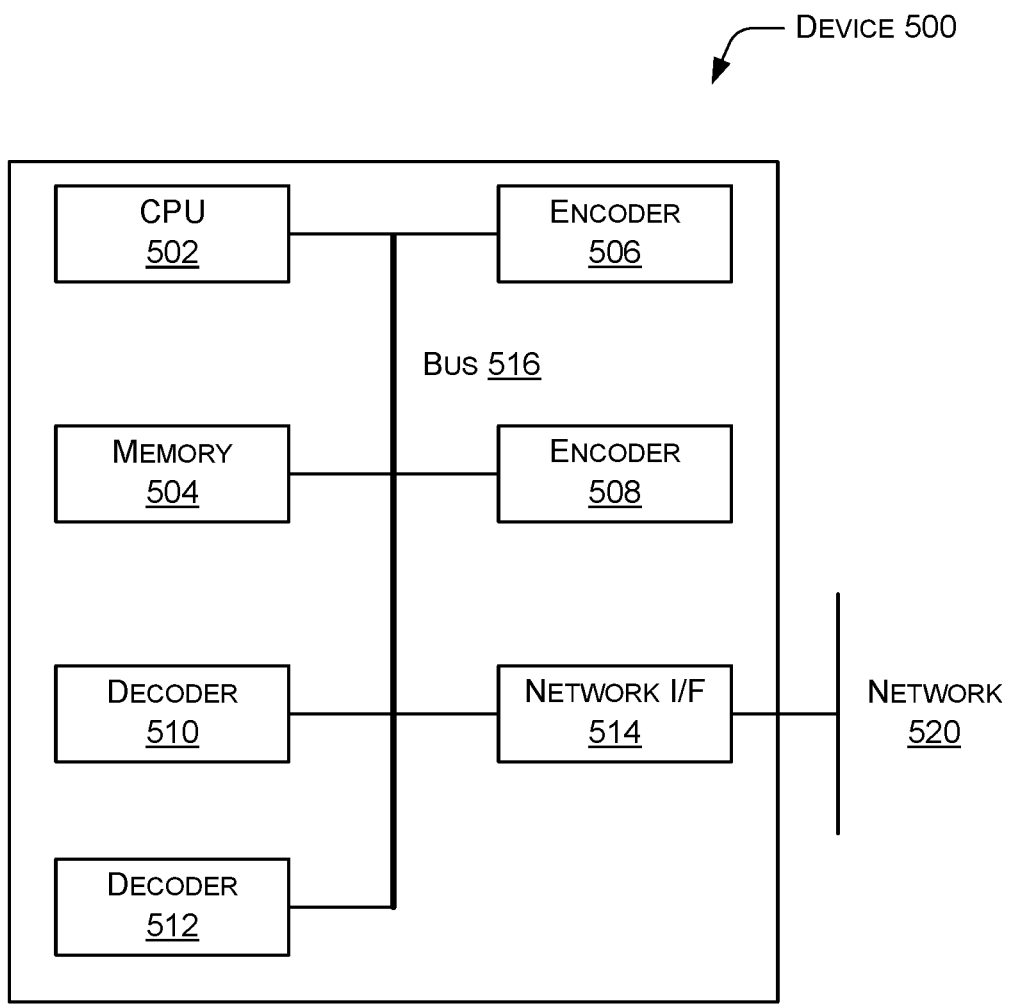
FIG. 5 is a block diagram illustrating the exemplary components of a device capable of transmitting and receiving video communication, according to an embodiment of the disclosure.

FIG. 5 illustrates the exemplary components of a device 500 that can be the first device 102 or the second devices 104 of FIG. 1. The device 500 can include a processor (e.g., a central processing unit (CPU)) 502, a memory 504, one or more video encoders 506 and 508, one or more video decoders 510 and 512, and a network interface module 514 for connecting to a network 520. The processor 502, memory 504, video encoders 506, 508, video decoders 510, 512, and network interface module 514 can be interconnected by a bus 516. The memory 504 can include buffers for storing reference frames from multiple bit streams. Separate buffers may be allocated for the multiple bit streams used in the process illustrated in FIGS. 2-4. Each bit stream may also have its own encoder and decoder. Although only two encoders and two decoders are shown in FIG. 5, the device 500 may include additional encoders and decoders. The encoders and decoders can be implemented in either hardware or software or a combination of the two.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 2-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
an encoder configured to encode a first bit stream and a second bit stream, the first bit stream and the second bit stream corresponding to bit streams having different bitrates or resolutions of a same video; and
a network interface module configured to transmit a first plurality of frames of the first bit stream and a second plurality of frames of the second bit stream alternately frame by frame between the first bit stream and the second bit stream over a network, wherein if receiving a feedback indicating that a frame of the first bit stream is successfully received and decoded by a receiver, the encoder is configured to continue encoding and transmitting additional frames of the first bit stream, and cease encoding and transmitting additional frames of the second bit stream.

2. The device of claim 1, further comprising a processor communicatively coupled to the encoder, the processor configured to determine a first encoding parameter of the first bit stream and a second encoding parameter of the second bit stream, the first encoding parameter different from the second encoding parameter, wherein the first encoding parameter comprises a first bitrate and the second encoding parameter comprises a second bitrate.

3. The device of claim 1, further comprising a processor communicatively coupled to the encoder, the processor configured to determine a first encoding parameter of the first bit stream and a second encoding parameter of the second bit stream, the first encoding parameter different from the second encoding parameter, wherein the first encoding parameter comprises a first video resolution and the second encoding parameter comprises a second video resolution.

4. The device of claim 3, wherein the first video resolution is higher than the second resolution, and wherein the network interface module is further configured to transmit one of the first plurality of frames before any of the second plurality of frames.

5. The device of claim 1, further comprising a memory including a first buffer configured to store the first plurality of frames and a second buffer configured to store the second plurality of frames.

6. The device of claim 1, further comprising a processor communicatively coupled to the encoder, the processor configured to determine a first encoding parameter of the first bit stream and a second encoding parameter of the second bit stream, the first encoding parameter different from the second encoding parameter, wherein the processor is further configured to determine one of the first and second encoding parameters for encoding a current frame.

7. The device of claim 6, wherein the one of the first and second encoding parameters is determined based on the feedback from the receiver.

8. The device of claim 7, wherein the processor is further configured to:
select the first encoding parameter if the feedback indicates that one of the first plurality of frames is received by the receiver before any of the second plurality of frames.

9. A method of establishing a connection comprising:
  encoding a first plurality of frames of a first bit stream of a video with a first encoding parameter;
  encoding a second plurality of frames of a second bit stream of the video with a second encoding parameter;
  transmitting to a receiver the first plurality of frames and the second plurality of frames frame by frame in an alternate manner between the first plurality of frames and the second plurality of frames;
  receiving a feedback from the receiver after transmitting the first and second plurality of frames; and
  selecting one of the first encoding parameter or the second encoding parameter based on the feedback, wherein encoding additional frames of a bit stream corresponding to an unselected one of the first encoding parameter or the second encoding parameter is ceased.

10. The method of claim 9, further comprising:
  reserving a first storage for the first plurality of frames; and
  reserving a second storage for the second plurality of frames.

11. The method of claim 9, wherein the first encoding parameter comprises a first bitrate and the second encoding parameter comprises a second bitrate.

12. The method of claim 9, wherein the first encoding parameter comprises a first video resolution and the second encoding parameter comprises a second video resolution.

13. The method of claim 12, wherein the first video resolution is higher than the second resolution, and wherein one of the first plurality of frames is transmitted before any of the second plurality of frames.

14. The method of claim 1, wherein:
  if the feedback indicates one of the first plurality of frames having been received by the receiver, the first encoding parameter is selected, and
  if the feedback indicates one of the second plurality of frames having been received by the receiver, the second encoding parameter is selected.

15. A non-transitory computer-readable storage medium storing computer-readable instructions executable by one or more processors, that when executed by the one or more processors, cause the one or more processors to perform operations comprising:
  encoding a first plurality of frames of a first bit stream of a video with a first encoding parameter;
  encoding a second plurality of frames of a second bit stream of to video with a second encoding parameter;
  transmitting to a receiver the first plurality of frames and the second plurality of frames frame by frame in an alternate manner between the first plurality of frames and the second plurality of frames;
  receiving a feedback from the receiver after transmitting the first and second plurality of frames; and
  selecting one of the first encoding parameter or the second encoding parameter based on the feedback, wherein encoding additional frames of a bit stream corresponding to an unselected one of the first encoding parameter or the second encoding parameter is ceased.

16. The non-transitory computer-readable storage medium of claim 15, wherein the operations further comprise:
  reserving a first storage for the first plurality of frames; and
  reserving a second storage for the second plurality of frames.

17. The non-transitory computer-readable storage medium of claim 15, wherein the first encoding parameter comprises a first bitrate and the second encoding parameter comprises a second bitrate.

18. The non-transitory computer-readable storage medium of claim 15, wherein the first encoding parameter comprises a first video resolution and the second encoding parameter comprises a second video resolution.

* * * * *